United States Patent
Choi et al.

(10) Patent No.: US 8,246,074 B2
(45) Date of Patent: Aug. 21, 2012

(54) AIRBAG MOUNTING ASSEMBLY FOR VEHICLES

(75) Inventors: Hyoung Ho Choi, Gwangmyeong-si (KR); Hyock In Kwon, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 32 days.

(21) Appl. No.: 12/907,838

(22) Filed: Oct. 19, 2010

(65) Prior Publication Data

US 2011/0115200 A1    May 19, 2011

(30) Foreign Application Priority Data

Nov. 13, 2009 (KR) .................. 10-2009-0109514
Jun. 29, 2010 (KR) .................. 10-2010-0061612

(51) Int. Cl.
 *B60R 21/205* (2011.01)
 *B62D 25/14* (2006.01)
(52) U.S. Cl. ............... 280/728.2; 280/732; 280/752; 296/72
(58) Field of Classification Search ........... 280/728.2, 280/732, 752; 296/187.05, 192, 193.02, 296/72
 See application file for complete search history.

(56) References Cited

U.S. PATENT DOCUMENTS

| | | | | |
|---|---|---|---|---|
| 5,074,583 A * | 12/1991 | Fujita et al. | ......... | 280/730.1 |
| 5,085,465 A * | 2/1992 | Hieahim | ......... | 280/738 |
| 5,087,067 A * | 2/1992 | Seki et al. | ......... | 280/732 |
| 5,135,253 A * | 8/1992 | Hirashima et al. | ......... | 280/732 |
| 5,150,919 A * | 9/1992 | Sakakida et al. | ......... | 280/732 |
| 5,489,116 A * | 2/1996 | Boag | ......... | 280/728.2 |
| 6,250,669 B1 * | 6/2001 | Ohmiya | ......... | 280/732 |
| 6,520,532 B2 * | 2/2003 | Kobayashi et al. | ......... | 280/728.2 |
| 6,536,802 B1 * | 3/2003 | Sutherland et al. | ......... | 280/752 |
| 6,616,182 B2 * | 9/2003 | Woolley et al. | ......... | 280/732 |
| 6,692,017 B2 * | 2/2004 | Taoka et al. | ......... | 280/728.2 |
| 6,983,954 B2 * | 1/2006 | Sakaguchi | ......... | 280/728.2 |
| 7,090,244 B2 * | 8/2006 | Lim | ......... | 280/728.2 |
| 7,293,795 B2 * | 11/2007 | Kong | ......... | 280/732 |
| 7,448,642 B2 * | 11/2008 | Boggess et al. | ......... | 280/728.2 |
| 7,478,832 B2 * | 1/2009 | Kong | ......... | 280/748 |
| 7,552,519 B2 * | 6/2009 | Enders | ......... | 280/728.2 |
| 7,850,198 B2 * | 12/2010 | Hayakawa et al. | ......... | 280/730.1 |
| 2008/0007032 A1 * | 1/2008 | Sadek et al. | ......... | 280/728.3 |

FOREIGN PATENT DOCUMENTS

| | | | | |
|---|---|---|---|---|
| JP | 04303051 A | * | 10/1992 | |
| JP | 10-59106 A | | 3/1998 | |
| KR | 2001065957 A | * | 7/2001 | |
| KR | 2004043570 A | * | 5/2004 | |
| KR | 2008026814 A | * | 3/2008 | |
| KR | 828582 B1 | * | 5/2008 | |
| KR | 2009019261 A | * | 2/2009 | |

* cited by examiner

*Primary Examiner* — Paul N Dickson
*Assistant Examiner* — Laura Freedman
(74) *Attorney, Agent, or Firm* — Morgan, Lewis & Bockius LLP (57) ABSTRACT

An airbag mounting assembly for vehicles to mount a passenger airbag housing to a cowl cross bar may include a mounting bracket, a first end thereof being mounted to the passenger airbag housing and a fastening unit mounting a second end of the mounting bracket to the cowl cross bar.

10 Claims, 9 Drawing Sheets

AIRBAG MOUNTING ASSEMBLY FOR VEHICLES

CROSS-REFERENCE TO RELATED APPLICATIONS

The present application claims priority to Korean Patent Application No. 10-2009-0109514 filed on Nov. 13, 2009 and Korean Patent Application Number 10-2010-0061612 filed on Jun. 29, 2010, the entire contents of which is incorporated herein for all purposes by this reference.

BACKGROUND OF THE INVENTION

1. Field of the Invention

The present invention relates to airbag mounting assemblies for vehicles and, more particularly, to an airbag mounting assembly for mounting a passenger airbag both to a crush pad and to a cowl cross bar using a pair of mounting brackets in a vehicle.

2. Description of Related Art

Passenger airbags are safety devices for vehicles, which can protect passengers sitting in the passenger side of the front seat in case of a vehicle crash. The passenger airbag is typically installed in a crush pad provided in the front of a passenger compartment of a vehicle.

The passenger airbag is coupled to an airbag door separately or integrally combined with crush pad parts such that, when an airbag cushion is inflated with compressed gas, the airbag door must automatically open to allow the inflated airbag cushion to expand toward a passenger and the airbag must keep hinge units of the airbag door in an open state. Furthermore, to support the repulsive force generated by the expansion of the airbag cushion and to support the weight of the airbag module when the vehicle is running, the passenger airbag must be additionally mounted to a cowl cross bar, which is the rigid element of the crush pad.

Figure 8A:
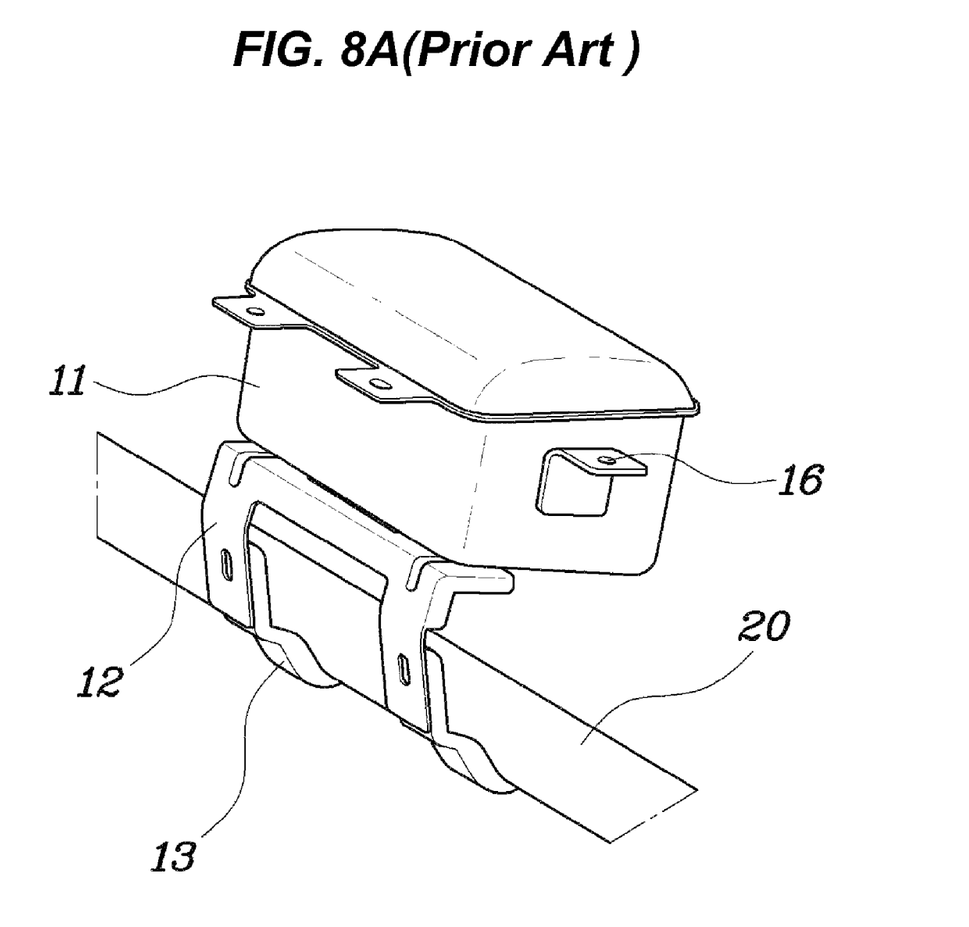
FIG. 8A is a perspective view illustrating a conventional structure for mounting a passenger airbag in a vehicle.
Figure 8B:
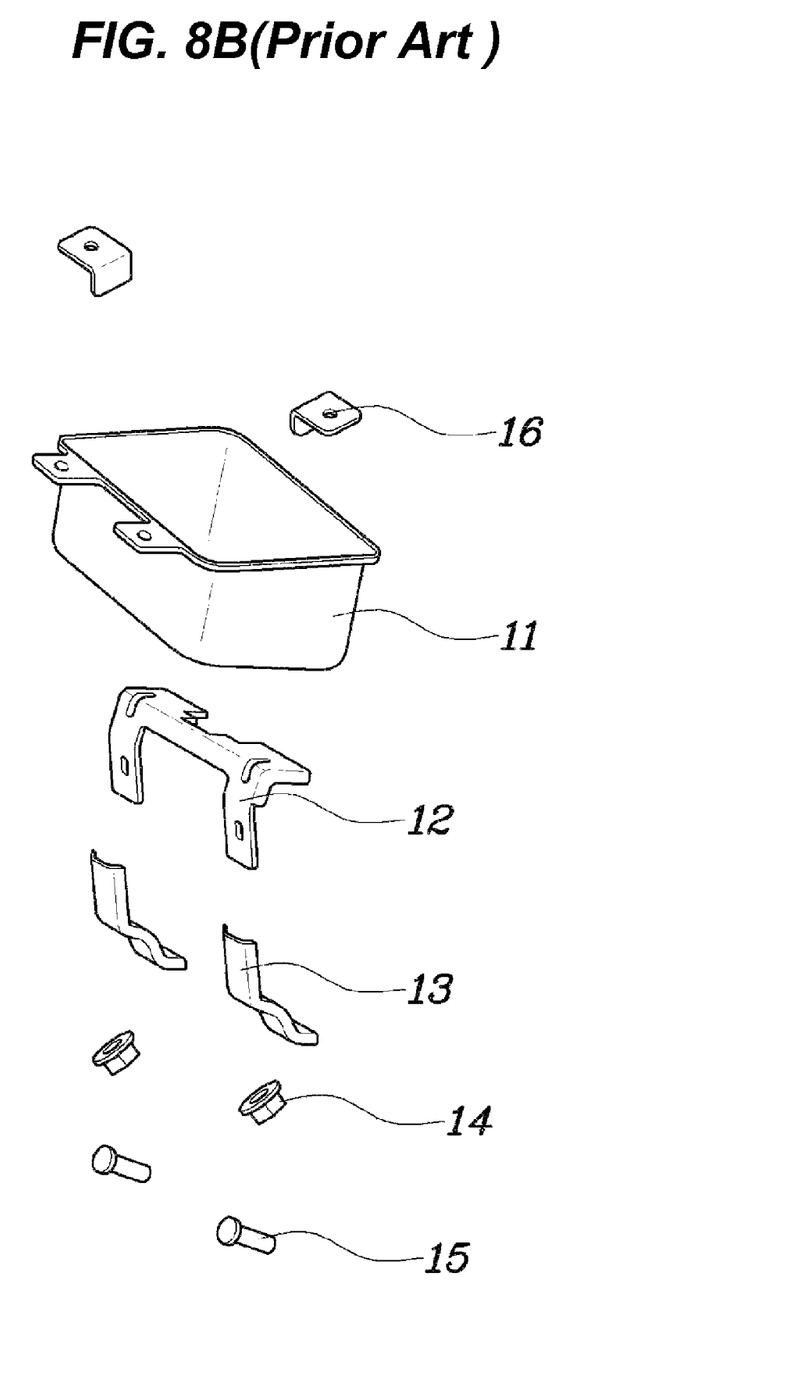
FIG. 8B is an exploded perspective view illustrating the conventional structure for mounting the passenger airbag in the vehicle.

FIG. 8A and FIG. 8B are views illustrating a conventional structure for mounting a passenger airbag in a vehicle.

Particularly, as shown in FIG. 8A and FIG. 8B, to mount the conventional airbag in a crush pad, it is required to use various kinds of airbag mounting brackets.

For example, the conventional airbag must require a side bracket 16 for mounting an airbag module to the crush pad and both an airbag mounting bracket 12 and a cowl cross mounting bracket 13 for mounting the crush pad assembled with the airbag module to a cowl cross bar 20.

To mount the airbag module to the cowl cross bar 20 having a hollow tubular structure with a circular cross-section, a cowl cross mounting bracket 13 is primarily formed such that the shape of the cowl cross mounting bracket 13 corresponds to the profile of the cowl cross bar 20. Thereafter, the cowl cross mounting bracket 13 is welded to the cowl cross bar 20. Further, the end of the cowl cross mounting bracket 13 remote from the cowl cross bar 20 is provided with both a flat part and a nut 14 for locking the cowl cross mounting bracket 13 to the airbag mounting bracket 12 extending downwards from the airbag module. The lower end of the airbag mounting bracket 12 is locked to the flat part of the cowl cross mounting bracket 13 using a bolt 15. Thereafter, an airbag housing 11 having the side bracket 16 is mounted to the airbag mounting bracket 12.

However, the conventional airbag is problematic in that, because the airbag requires a plurality of brackets to improve the efficiency with which the airbag module is assembled to the cowl cross bar and is assembled to make contact with the circular shape of the cowl cross bar 20, the plurality of brackets increase the production cost and complicate the assembly process of the airbag, and require an excessively large installation space for the airbag. In other words, the space defined between the airbag module and the cowl cross bar is reduced due to the excessive number of brackets, so that it is difficult to secure a desired mounting flat part in the space. Furthermore, the two types of mounting brackets 12 and 13 overlap each other, so that, when downward impact is imposed on the airbag module assembled in the crush pad, there is a reduced space in which bracket deformation can absorb the impact energy. Thus, it is required to provide an airbag mounting structure capable of solving the problems experienced in the conventional airbag mounting structure and of reducing the number of parts of the structure.

Furthermore, to actuate the airbag in case of a vehicle crash, it is required to supply electricity to an inflator so as to ignite the inflator. Thus, a wire harness for supplying electricity to the inflator must be coupled to a connector. To couple the wire harness to the connector, it is necessary to define a work space at a location below the airbag module. In a conventional method, a lead wire is installed in the inflator such that the wire harness can be coupled to the connector at a desired location other than a location below the airbag module, so that the conventional method requires an additional lead wire. However, in the present invention, the mounting brackets are moved to opposite sides of the airbag module, so that a desired work space can be defined at a location below the airbag module, thus solving the problem of the necessity of the additional lead wire.

The above description of the related art has been intended to promote comprehension of the background of the present invention, and is not to be interpreted as a conventional technique well-known to those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to propose an airbag mounting assembly for vehicles, which can mount a passenger airbag both to a crush pad and to a cowl cross bar using a reduced number of parts, thus realizing compatibility of parts and improving productivity of the assembly.

According to one aspect of the present invention, there is provided an airbag mounting assembly for vehicles, which can mount a passenger airbag to a cowl cross bar in a way such that the passenger airbag can be mounted to the cowl cross bar using a cowl bolt locked to a mounting bracket provided on an end surface of the cowl cross bar.

In an aspect of the present invention, the airbag mounting assembly for vehicles to mount a passenger airbag housing to a cowl cross bar, may include a mounting bracket, a first end thereof being mounted to the passenger airbag housing, and a fastening unit mounting a second end of the mounting bracket to the cowl cross bar.

The fastening unit may be a cowl bolt, wherein the mounting bracket is mounted to at least one end of the passenger airbag housing and is provided with a locking flange at the first end thereof to be mounted to a crush pad, and the second end of the mounting bracket includes a locking hole to mount the mounting bracket to the cowl cross bar therethrough.

The mounting bracket may include a first mounting portion mounted to the passenger airbag housing, wherein the first mounting portion includes the locking flange mounted to the crush pad, and a second mounting portion extending from the first mounting portion while being twisted from the first mounting portion, wherein the second mounting portion includes the locking hole and is mounted to the cowl cross bar by the cowl bolt through the locking hole.

The locking flange of the first mounting portion and the locking hole of the second mounting portion may have different orientations such that the locking flange and the locking hole are arranged to face the crush pad and the cowl cross bar, respectively.

The second mounting portion may be provided with a bent part in which a bending moment is generated in response to an external impact applied thereto, the bent part being disposed between the first and second ends of the mounting bracket, wherein the bent part is provided with a bending slot for allowing a bending moment to be easily generated in the bent part.

The mounting bracket may include a pair of mounting brackets mounted to opposite end surfaces of the passenger airbag housing.

The cowl bolt may include a bolt body mounted to an outer surface of the cowl cross bar, and a locking protrusion protruding from the bolt body and inserted into the locking hole of the second mounting portion, wherein the locking protrusion inserted into the locking hole is mounted to the second mounting bracket by using a nut.

The bolt body of the cowl bolt may be provided with a round surface part corresponding to the outer surface of the cowl cross bar.

The bolt body of the cowl bolt may be provided with a flat surface part attached to the outer surface of the cowl cross bar.

The airbag mounting assembly may further include a stop flange extending from an end of the second mounting portion in an longitudinal axis of the locking protrusion while being bent therefrom, the stop flange preventing the mounting bracket from being removed from the cowl cross bar when an airbag expands.

The locking hole may be a slot.

As described above, the present invention is advantageous as follows.

First, the present invention can mount a passenger airbag both to a crush pad and to a cowl cross bar using a common mounting bracket, so that the present invention can simplify the construction of the airbag mounting assembly and can reduce the number of working steps, the product weight and the manufacturing cost of the airbag mounting assembly, thereby improving productivity of the airbag mounting assembly.

Second, unlike conventional airbag mounting assemblies which must be separately produced for different design factors determined by vehicle models, the present invention integrates the different design factors into one mounting bracket, thus simplifying the design of airbags and efficiently producing products.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
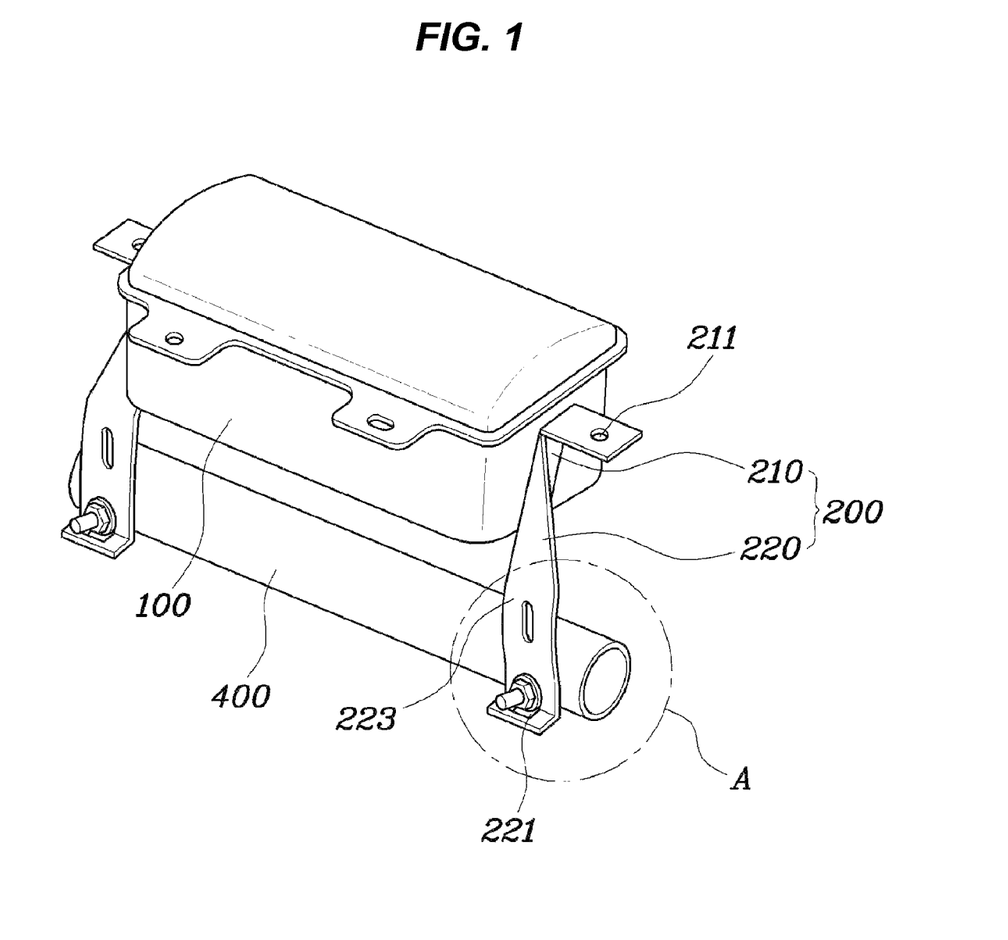
FIG. 1 is a perspective view illustrating an assembled state of an airbag mounting assembly for vehicles according to an embodiment of the present invention.
Figure 2:
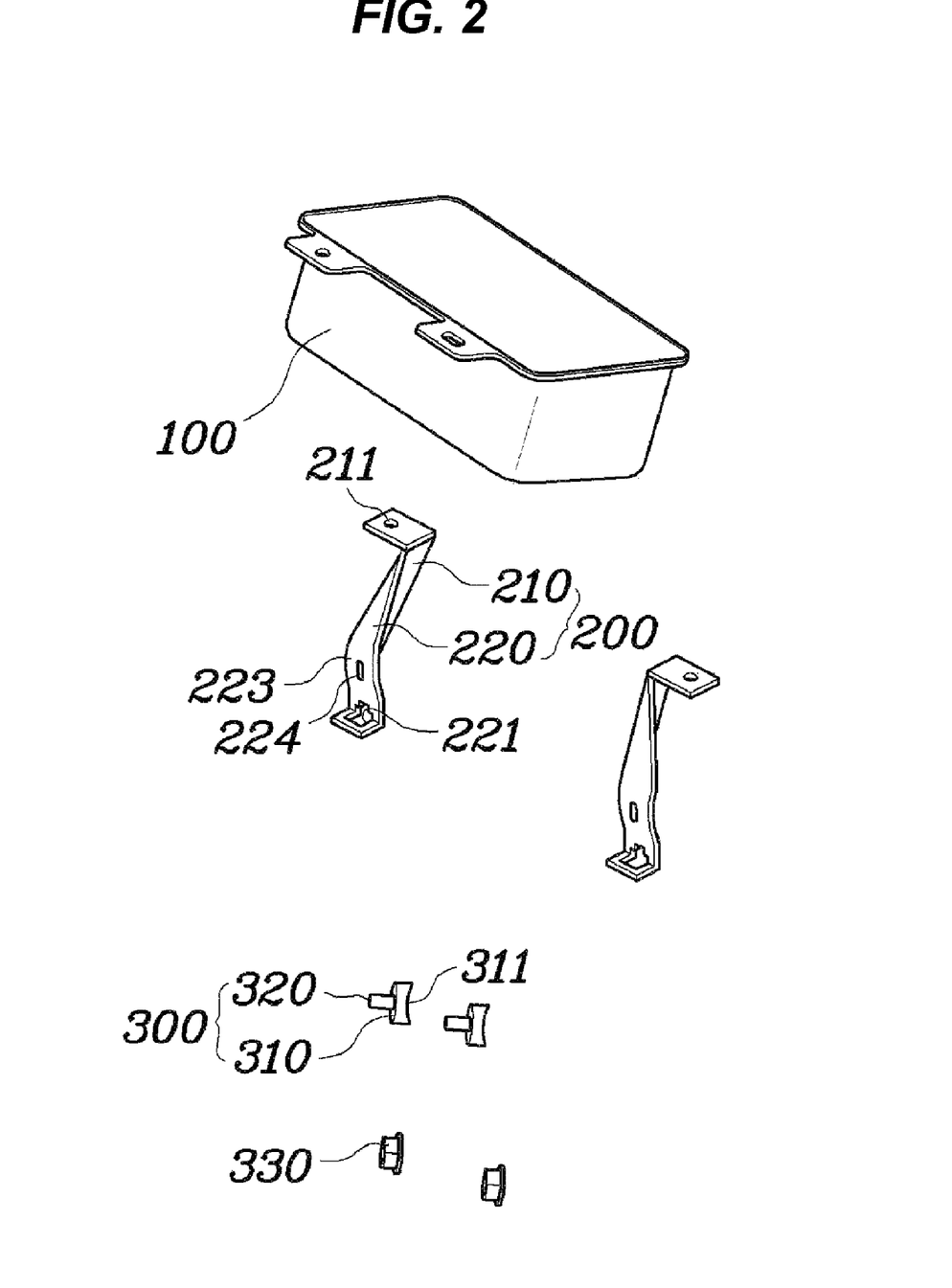
FIG. 2 is an exploded perspective view illustrating the airbag mounting assembly for vehicles according to the embodiment of the present invention.
Figure 3:
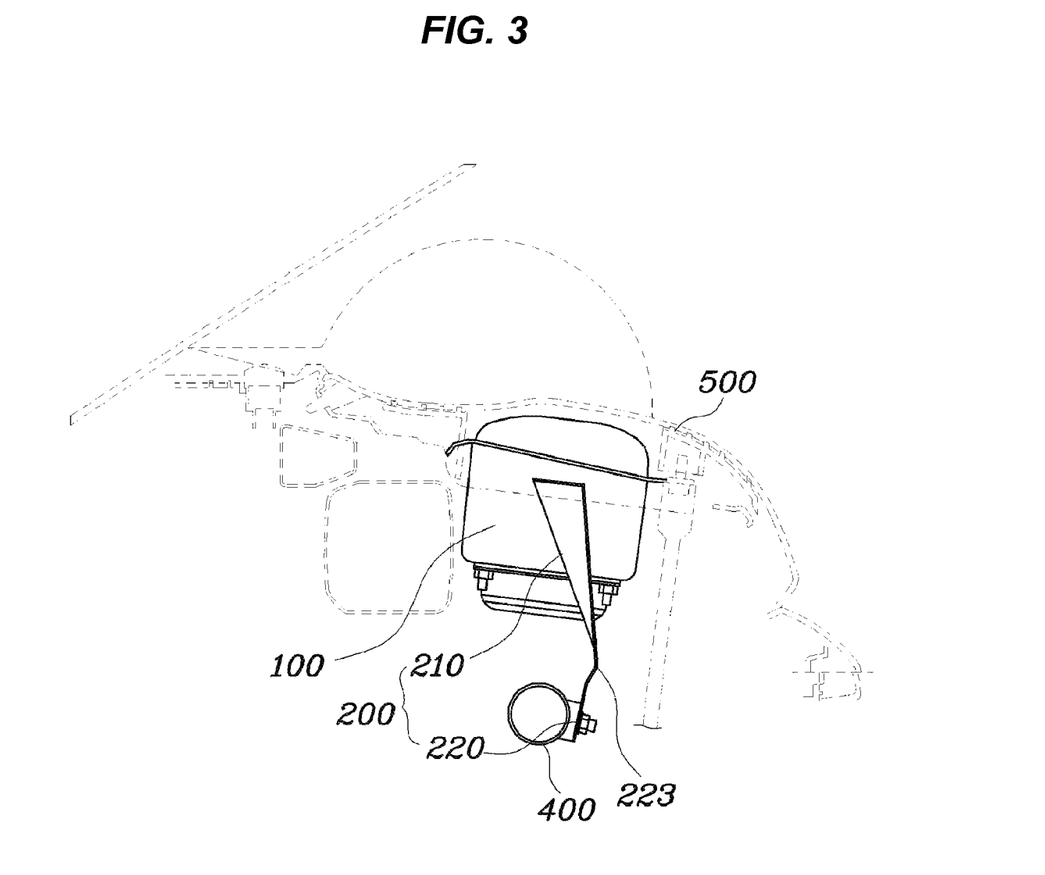
FIG. 3 is a view illustrating an installed state of the airbag mounting assembly for vehicles according to the embodiment of the present invention.

FIG. 1 is a perspective view illustrating an assembled state of an airbag mounting assembly for a vehicle according to an embodiment of the present invention. FIG. 2 is an exploded perspective view illustrating the airbag mounting assembly for a vehicle according to the embodiment of the present invention. FIG. 3 is a view illustrating an installed state of the airbag mounting assembly for a vehicle according to the embodiment of the present invention.

As shown in FIG. 1 through FIG. 3, the airbag mounting assembly for a vehicle according to the embodiment of the present invention includes a pair of mounting brackets 200 mounted to a passenger airbag housing 100. Opposite ends of each mounting bracket 200 are mounted to a crush pad 500 and to a cowl cross bar 400, respectively. Thus, the present invention simplifies the design and production process of the airbag mounting assembly and provides a space for absorbing an external impact.

Described in detail, the mounting brackets 200 according to the embodiment are welded to opposite end surfaces of the passenger airbag housing 100. Here, the passenger airbag housing 100 includes an airbag cushion therein and is mounted both to a crush pad 500 and to a cowl cross bar 400 using the mounting brackets 200.

In the embodiment, the passenger airbag housing 100 is mounted both to the crush pad 500 and to the cowl cross bar 400 using a mounting bracket 200, which is mounted on each end surface of the passenger airbag housing 100. However, in the present invention, the passenger airbag housing 100 may be mounted both to the crush pad 500 and to the cowl cross bar 400 using one mounting bracket 200. In the above state, the welded position of the mounting bracket 200 relative to the passenger airbag housing 100 may be changed as desired.

The mounting bracket 200 includes an integrated bracket, which includes a first mounting portion 210 mounted both to the passenger airbag housing 100 and to the crush pad 500 and a second mounting portion 220 mounted to the cowl cross bar 400. The first mounting portion 210 and the second mounting portion 220 integrally extend from each other while being bent from each other.

Described in detail, the first mounting portion 210 is mounted to an end surface of the passenger airbag housing 100 and has a holed locking flange 211 at an end thereof to be mounted to the crush pad 500. The locking flange 211 is provided with a locking hole for receiving a locking member, such as a locking bolt, therein. The locking bolt is tightened to the crush pad 500 after passing through the locking flange 211.

Further, the second mounting portion 220 extends from the first mounting portion 210 while being bent from the first mounting portion 210 and has a locking hole 221 at an end thereof to be mounted to the cowl cross bar 400. The locking hole 221 is a slot type hole and receives therein a cowl bolt 300 used as a fastening unit of the present invention.

Particularly, the second mounting portion 220 is provided with a bent part 223 in which a bending moment is generated in response to an external impact applied thereto. When a head impact is applied to an upper end of the passenger airbag housing 100, the bent part 223 acts as an inflection point in which a bending moment is generated. In the above state, the bending moment generated in the bent part 223 in response to an external impact applied thereto is determined by multiplying a distance between the bent part 223 and a head impact applying position by the head impact force. Further, the bent part 223 is provided with a bending slot 224 for allowing a bending moment to be easily generated in the bent part 223. The bending slot 224 reduces the surface area of the bent part 223, thus allowing a bending moment to be easily generated in the portion having the bending slot 224.

The locking flange 211 of the first mounting portion 210 and the locking hole 221 of the second mounting portion 220 have different orientations such that the locking flange 221 and the locking hole 221 can be arranged to face the crush pad 500 and the cowl cross bar 400, respectively.

In other words, the mounting bracket 200 having both the first mounting portion 210 and the second mounting portion 220 is formed in a general twisted shape such that the mounting bracket 200 can be efficiently mounted both to the crush pad 500 and to the cowl cross bar 400 at respective ends. In the twisted mounting bracket 200, the locations and orientations of the locking flange 211 and the locking hole 221 may be changed according to positions of the crush pad 500 and the cowl cross bar 400.

Figure 4:
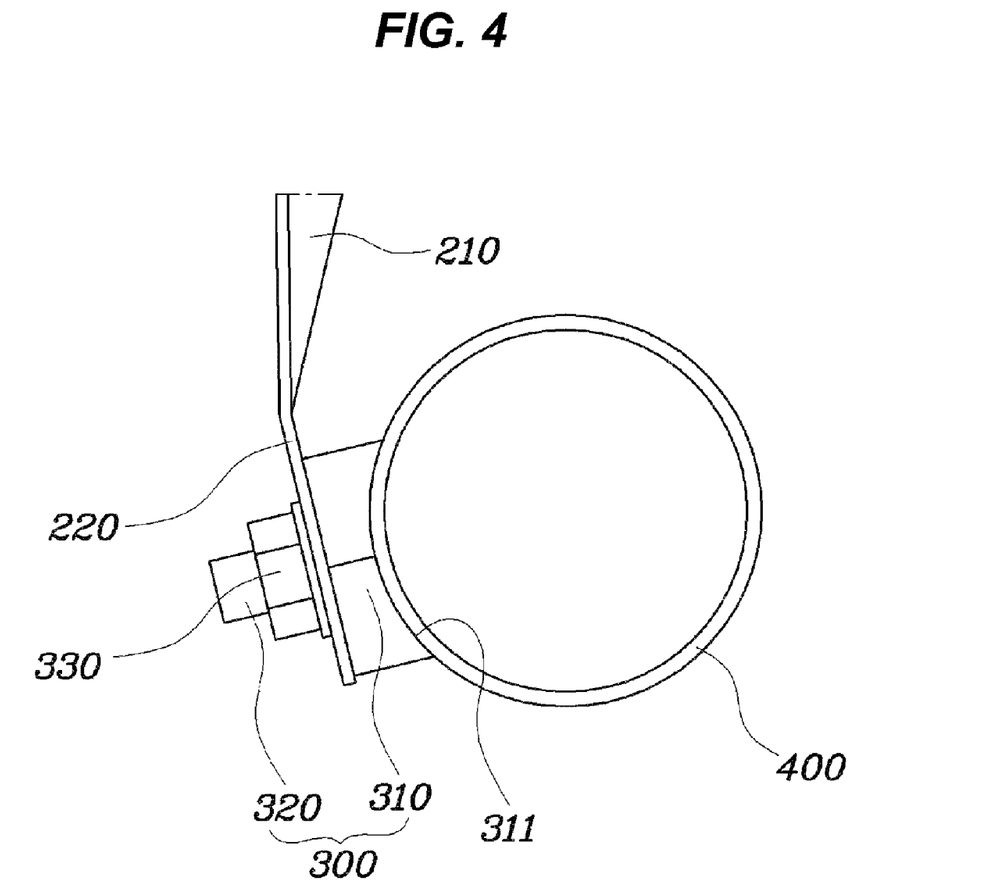
FIG. 4 is an enlarged side view of portion A in FIG. 1.
Figure 5:
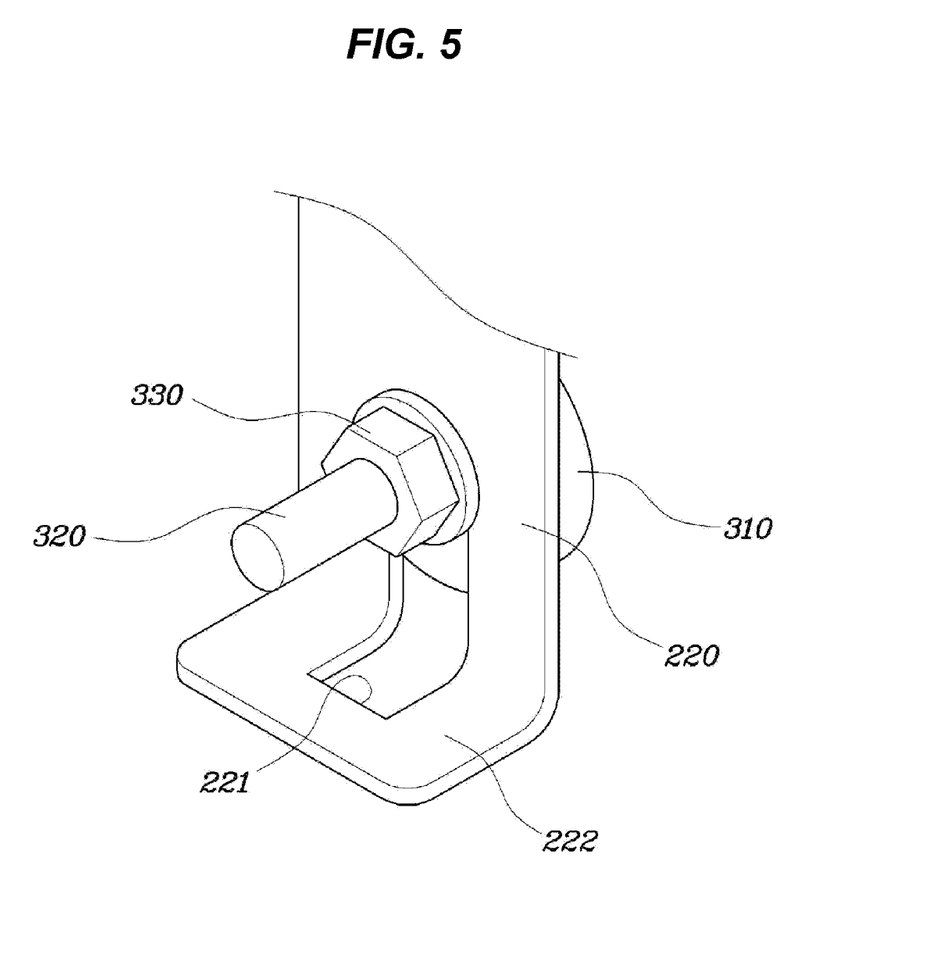
FIG. 5 is a perspective view of portion A in FIG. 1.
Figure 6:
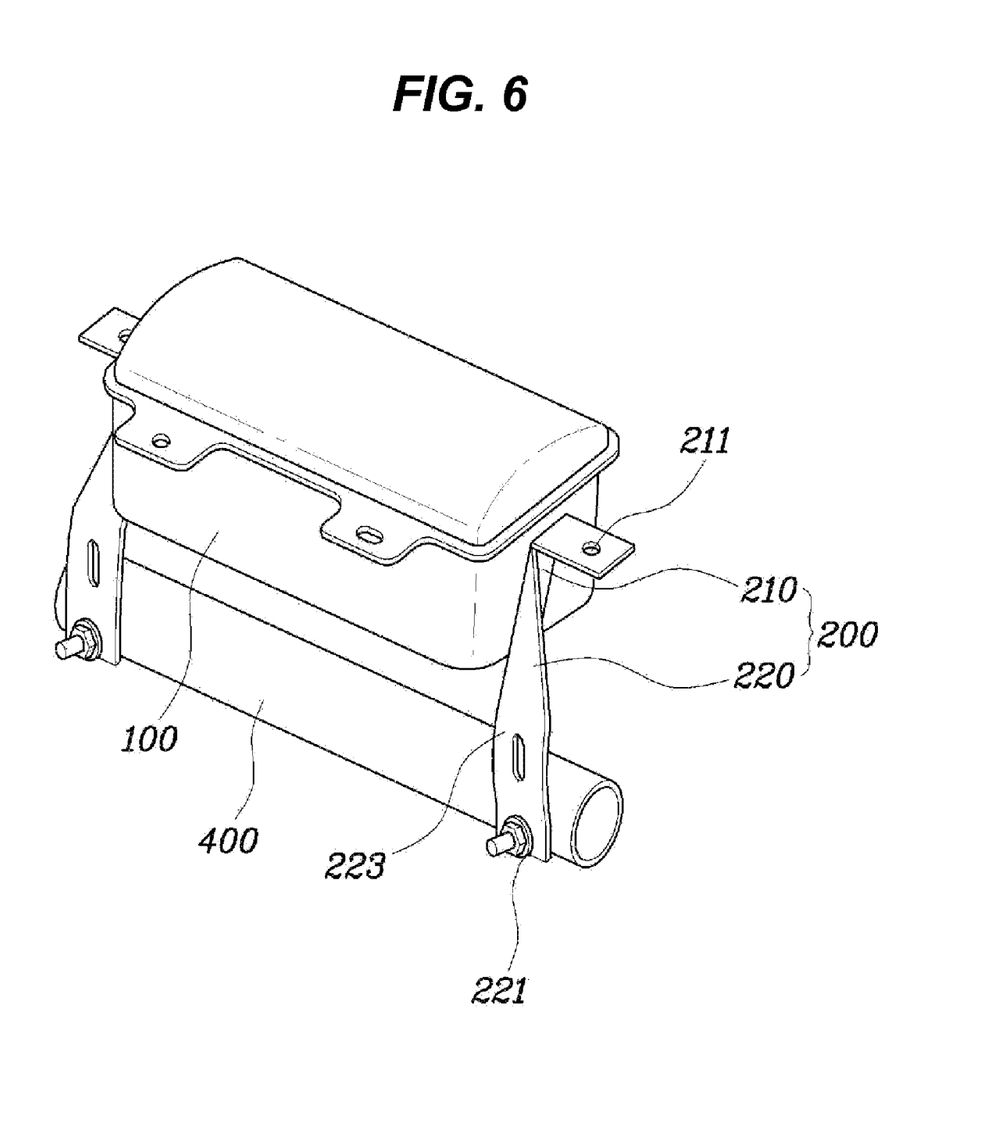
FIG. 6 is a perspective view of an airbag mounting assembly for vehicles according to a modification of the embodiment of the present invention.

FIG. 4 is an enlarged side view of portion A in FIG. 1. FIG. 5 is a perspective view of portion A in FIG. 1. FIG. 6 is a perspective view of an airbag mounting assembly for vehicles according to a modification of the embodiment of the present invention. HG. 7 is a side view of the airbag mounting assembly for vehicles according to the modification of the embodiment of the present invention.

As shown in FIG. 4, a cowl bolt 300 is used for mounting the mounting bracket 200 to the cowl cross bar 400. Described in detail, the cowl bolt 300 is mounted to the locking hole 221 of the mounting bracket 200 using a nut 330 and is welded to the cowl cross bar 400.

The cowl bolt 300 includes a bolt body 310 welded to the outer surface of the cowl cross bar 400 and a locking protrusion 320 protruding from the bolt body 310 and inserted into the locking hole 221 of the mounting bracket 200. Here, the locking protrusion 320 is inserted into the slot type locking hole 221 and is mounted to the second mounting portion 220 using the nut 330.

The bolt body 310 of the cowl bolt 300 is provided with a round surface part 311, which has a round surface corresponding to the outer surface of the cowl cross bar 400. When the round surface part 311 of the cowl bolt 300 has a concave surface as described above such that the round surface part 311 can be brought into close surface contact with the outer surface of the cowl cross bar 400 having a hollow tubular structure, the cowl bolt 300 can be closely integrated with the cowl cross bar 400 by welding.

As shown in FIG. 5, a bent stop flange 222 extends from the end of the second mounting portion 220 having the locking hole 221. When an airbag cushion expands, the bent stop flange 222 can prevent the undesired removal of the cowl bolt 300 from the locking hole 221 of the mounting bracket 200 regardless of the expansionary pressure of the airbag.

Described in detail, when the airbag cushion expands, the locking hole 221 of the mounting bracket 200 may be moved upwards in FIG. 5 due to expansionary pressure of the airbag. However, in the embodiment of the present invention, although the locking hole 221 is moved upwards, the end of the cowl bolt 300 mounted to the locking hole 221 is stopped by the stop flange 222, so that the mounting bracket 200 can be prevented from being removed from the cowl bolt 300.

As described above, the embodiment has the bent stop flange 222 extending from the end of the second mounting portion B20. However, in the present invention, it should be understood that only the locking hole 221 for locking the cowl bolt 300 to the mounting bracket 200 may be formed in the end of the second mounting portion 220 without having the stop flange 222, as shown in FIG. 6.

In the above state, when the airbag expansionary pressure is applied to the mounting bracket 200, the mounting bracket 200 may be moved upwards in FIG. 6 and the cowl bolt 300 may be removed from the locking hole 221.

Figure 7:
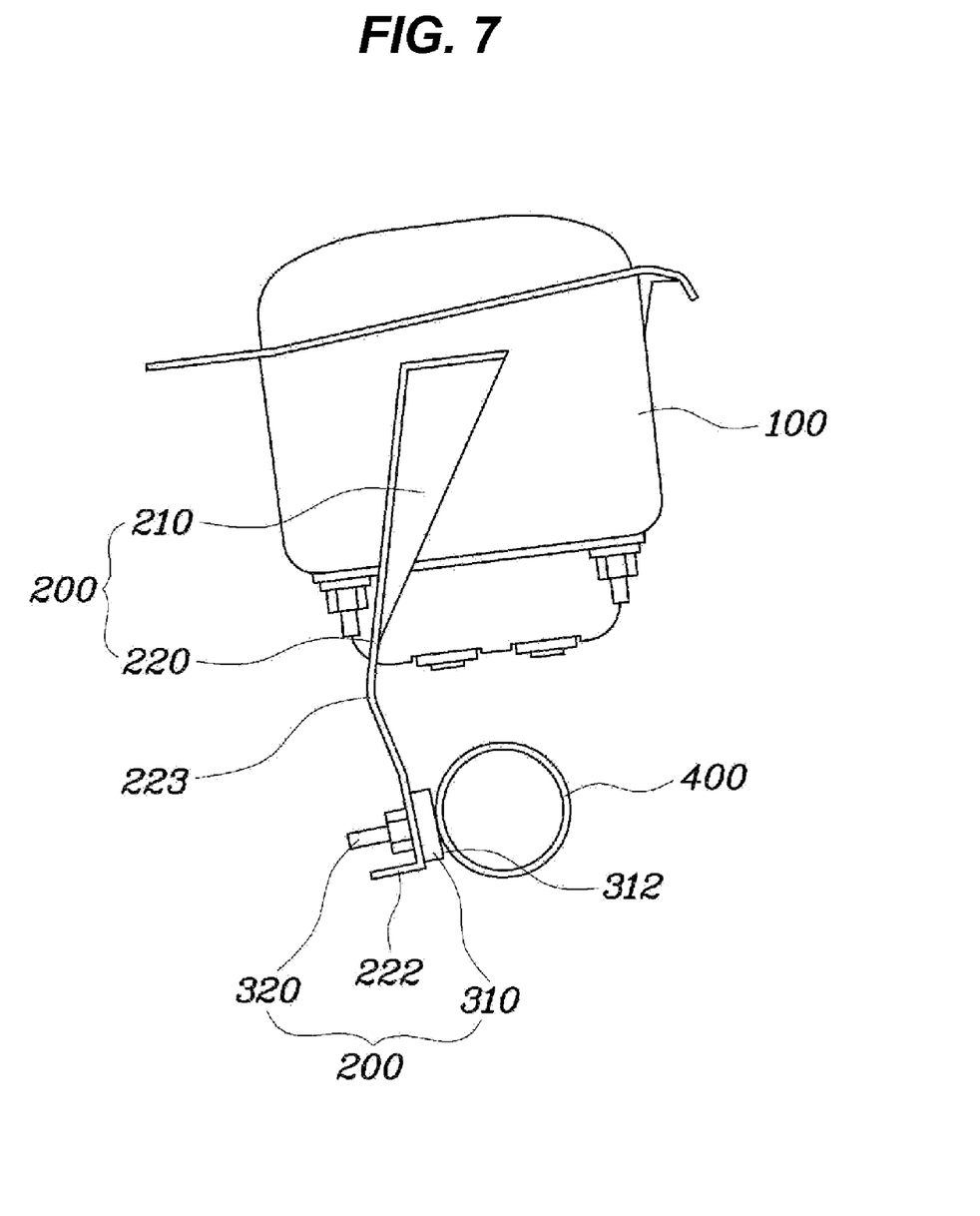
FIG. 7 is a side view of the airbag mounting assembly for vehicles according to the modification of the embodiment of the present invention.

Unlike the bolt body 310 having the above-mentioned round surface part 311, the bolt body 310 may be provided with a flat part 312, which will be brought into linear contact with the round outer surface of the cowl cross bar 400, as shown in FIG. 7.

The bolt body 310 having the flat part 312 may be combined with a cowl cross bar 400, which may be formed using cylindrical pipes having a variety of diameters or may be shaped as a square pipe having a square cross-section. When the bolt body 310 having the flat part 312 is combined with a cowl cross bar 400 shaped as a cylindrical pipe, the integration strength between the bolt body 310 and the round outer surface of the cowl cross bar 400 may be reduced in comparison to the bolt body 310 having the round surface part 311 capable of coming into close contact with the round outer surface of the cowl cross bar 400.

As described above, the present invention provides a cowl bolt, which can be mounted to a cowl cross bar having a round outer surface and can take the place of a conventional cowl cross mounting bracket, thus simplifying the construction of an airbag mounting assembly. Further, in the present invention, a mounting bracket is directly mounted to the cowl bolt, thus reducing the cost of the elements of the airbag mounting assembly, simplifying the airbag mounting process and solving the spatial problems experienced with the conventional airbag mounting assembly.

Further, the present invention provides an integrated bracket structure realized by integrating a conventional airbag mounting bracket with a side mounting bracket into a single structure, thus providing a simple airbag mounting structure. In other words, the present invention can provide a mounting bracket, which is produced by integrating three types of conventional mounting brackets into a single structure. Further, the shape of the integrated mounting bracket 200 is simplified, so that the present invention minimizes the loss of steel plates used as the material of the airbag mounting assembly. Further, when the integrated mounting bracket is opened, the bracket shows a simple rectangular shape, so that the bracket reduces the material loss thereof.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An airbag mounting assembly for vehicles to mount a passenger airbag housing to a cowl cross bar, the airbag mounting assembly comprising:
   a mounting bracket, a first end thereof being mounted to the passenger airbag housing; and
   a fastening unit mounting a second end of the mounting bracket to the cowl cross bar;
   wherein the fastening unit is a cowl bolt;
   wherein
      the mounting bracket is mounted to at least one end of the passenger airbag housing and is provided with a locking flange at the first end thereof to be mounted to a crush pad; and
      the second end of the mounting bracket includes a locking hole to mount the mounting bracket to the cowl cross bar therethrough; and
   wherein the mounting bracket comprises:
      a first mounting portion mounted to the passenger airbag housing, wherein the first mounting portion includes the locking flange mounted to the crush pad; and
      a second mounting portion extending from the first mounting portion while being twisted from the first mounting portion, wherein the second mounting portion includes the locking hole and is mounted to the cowl cross bar by the cowl bolt through the locking hole.

2. The airbag mounting assembly for vehicles according to claim 1, wherein the locking flange of the first mounting portion and the locking hole of the second mounting portion have different orientations such that the locking flange and the locking hole are arranged to face the crush pad and the cowl cross bar, respectively.

3. The airbag mounting assembly for vehicles according to claim 1, wherein the second mounting portion is provided with a bent part in which a bending moment is generated in response to an external impact applied thereto, the bent part being disposed between the first and second ends of the mounting bracket.

4. The airbag mounting assembly for vehicles according to claim 3, wherein the bent part is provided with a bending slot for allowing a bending moment to be easily generated in the bent part.

5. The airbag mounting assembly for vehicles according to claim 1, wherein the mounting bracket comprises a pair of mounting brackets mounted to opposite end surfaces of the passenger airbag housing.

6. The airbag mounting assembly for vehicles according to claim 1, wherein the cowl bolt comprises:
   a bolt body mounted to an outer surface of the cowl cross bar; and
   a locking protrusion protruding from the bolt body and inserted into the locking hole of the second mounting portion,
   wherein the locking protrusion inserted into the locking hole is mounted to the second mounting bracket by using a nut.

7. The airbag mounting assembly for vehicles according to claim 6, wherein the bolt body of the cowl bolt is provided with a round surface part corresponding to the outer surface of the cowl cross bar.

8. The airbag mounting assembly for vehicles according to claim 6, wherein the bolt body of the cowl bolt is provided with a flat surface part attached to the outer surface of the cowl cross bar.

9. The airbag mounting assembly for vehicles according to claim 6, further comprising:
   a stop flange extending from an end of the second mounting portion in a longitudinal axis of the locking protrusion while being bent therefrom, the stop flange preventing the mounting bracket from being removed from the cowl cross bar when an airbag expands.

10. The airbag mounting assembly for vehicles according to claim 1 wherein the locking hole is a slot.

* * * * *